Sept. 11, 1928.
W. EISENBERG
1,684,310
MACHINE FOR FORMING HELICAL CHANNELS
Filed June 28, 1927
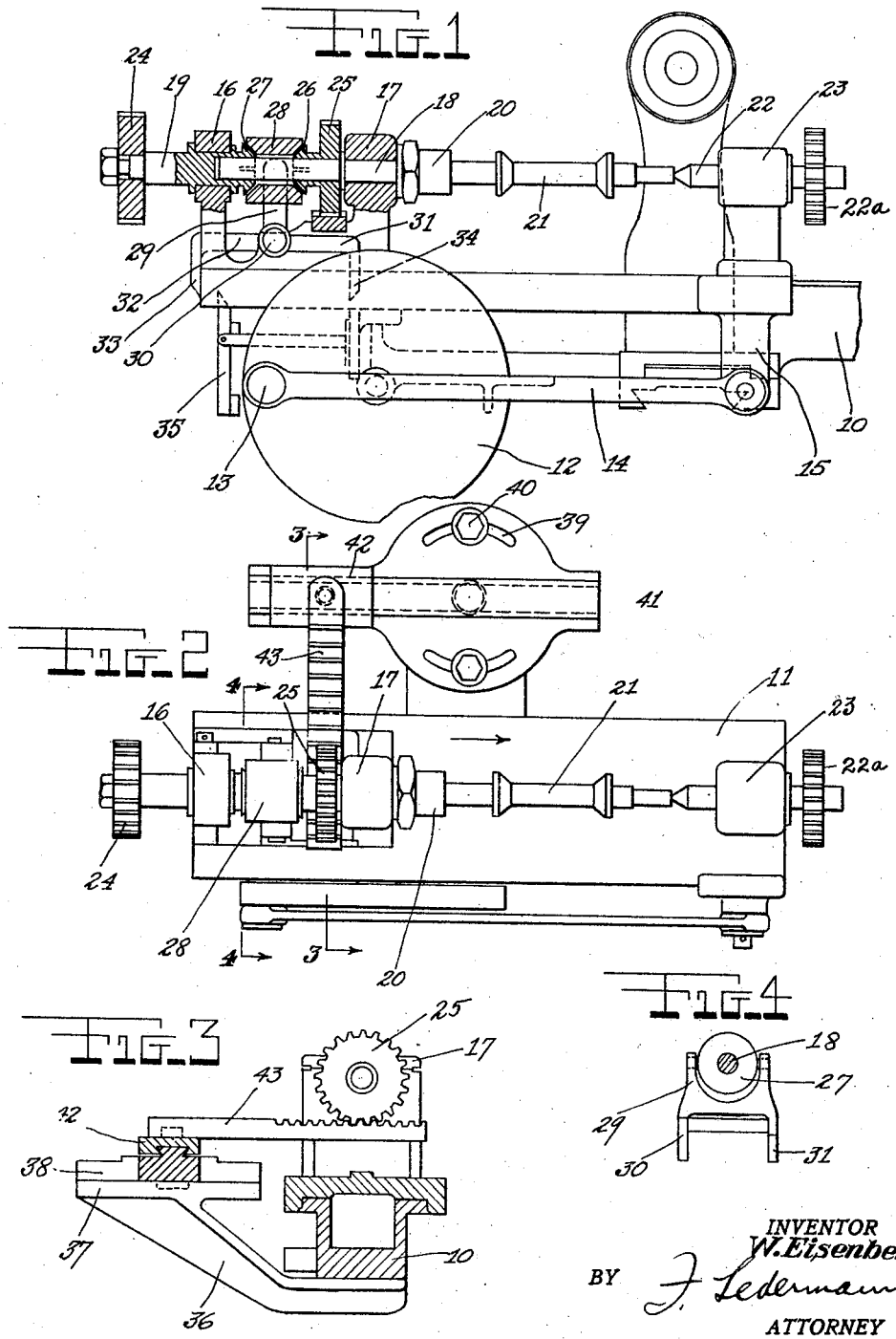
INVENTOR
W. Eisenberg
BY
F. Lederman
ATTORNEY Patented Sept. 11, 1928.

1,684,310

UNITED STATES PATENT OFFICE.

WILLIAM EISENBERG, OF EVANSVILLE, INDIANA.

MACHINE FOR FORMING HELICAL CHANNELS.

Application filed June 28, 1927. Serial No. 202,065.

The main object of this invention is to provide a machine which is adapted to cut a helical channel or slot in a tube sleeve or other similar piece of material. The machine is adapted to rotate a spindle or mandrel slowly by means which may be varied to form channels or grooves of various pitch.

Another object of this invention is to provide a machine for forming helical grooves or channels in a piece of work mounted on a mandrel. A rack bar forming a part of the machine rotates a spindle slowly as the rack bar is moved longitudinally along an inclined path with respect to the axis of the spindle and may be varied to cut channels or grooves of different pitch.

The above and other objects will become apparent in the description below in which characters of reference refer to like-named parts in the drawing.

Referring briefly to the drawing, Figure 1 is a longitudinal sectional elevational view of the machine which is used for the cutting of helical channels.

Figure 2 is a top plan view of the machine showing the spindle actuator carriage.

Figure 3 is a cross sectional view of the spindle actuator mechanism taken on line 3—3 of Figure 2.

Figure 4 is a cross sectional view taken on line 4—4 of Figure 2 showing the clutch operating mechanism used for reversing the rotation of the spindle of the machine.

Referring in detail to the drawing, the numeral 10 indicates the track or guide rail of a lathe or similar machine upon which the entire device disclosed in this application is mounted, and reciprocates thereon. A table 11 is slidably mounted on the rail and supports the entire device. At one position on the side of the frame of the lathe adjacent the guide rail 10, a disk 12 is rotatably mounted. Near its periphery a stud 13 projects from the face of disk. This stud is engaged by an arm 14 whose opposite end is pivotally secured to an ear 15 which is formed integrally with the table 11 and depends therefrom. It is to be noted that thru rotation of the disk the table is reciprocated to and fro a distance equal to the throw of the connecting arm 14.

A pair of bearing blocks 16 and 17, aligned with each other rise vertically from the table 11 near one end thereof. These blocks are provided with aligned openings. In the opening of the block 17 a spindle 18 is mounted rotatably. On one end of the spindle a chuck 20 is secured which supports one end of a mandrel 21 on which the work to be operated upon, is secured. The opposite end of the mandrel is engaged on the centering stud 22 of the tail stock 23, the latter being mounted on the table of the device. The centering stud is fixed on an adjustable spindle which is operated by a fluted hand wheel 22ª. The opposite bearing block 16 has a shaft 19 rotatably mounted therein which has a bore extending from the middle to its outer end and the bore receives the end of the spindle, the latter being rotatably mounted in said bore. The end of the shaft has a gear wheel 24 secured thereto which is constantly rotated in one direction by a source of power such as a chain of gears or the like. This gear 24 is not used in the operation of indexing the work but is made part of the construction so the member 18 may be continuously rotated when the clutch cone 28 contacts with the element 27 if and when it should be so desired. Another gear wheel 25 is rotatably mounted on the spindle adjacent the bearing 17. This gear has a split cone 26 projecting from its face which may be contracted so that it binds upon the spindle 18 and secures the gear wheel 25 thereto, it being noted that the gear wheel is normally free and able to rotate independently of the spindle.

The end of the shaft 19 which has the bore provided therein is also provided with a split cone 27. The inclined surfaces of these cones converge toward each other and both are adapted to engage the surface of the spindle to cause the gear wheels 24 or 25 to alternately rotate the spindle 18. A collar 28 encircles the spindle 18 between the cones and is provided with a conical seat at each end. This collar when urged into contact with either of the cones is adapted to cause any of the cones to bind to the spindle. This collar 28 has a fork 29 pivotally secured thereto. The fork is supported on a pin 30 and is rotatably mounted thereon. Arms 31 and 32 extend horizontally in opposite directions from the pivoted end of the fork. The arm 32 has a finger 33 extending downwardly therefrom and the opposite arm has a similar finger 34 suspended therefrom, both fingers being spaced apart from each other. Between the fingers an upright stop 35 is positioned. This stop is secured to the rigid part of the lathe and does not move with the carriage. The stop is adapted to engage one or the other of the fingers and thereby shift the collar 28 in one direction or the other so that it binds one or the other of the cones to the spindle.

A bracket 36 extends sidewise from the frame of the lathe and supports a bed plate 37 on which a turn table 38 is rotatably mounted. This turn table has a stud formed on its underside which is centered in a recess formed in the bed plate, said stud serving as an axis of rotation for the turn table. Arcuate slots 39 are formed at diametrically opposite positions in the turn table. A bolt 40 is passed thru each slot and is engaged in the bed plate 37 and serves the purpose of securing the turn table in place rigidly on the bed plate. A rail 41 having dove-tailed sides is rigidly mounted on the upper face of the turn table and serves as a guide for a movable carriage 42 which is slidable the entire length of the rail. A rack bar 43 is pivotally attached to the carriage and is slidably mounted on the table 11 and reciprocates thereon.

The device is used for forming helical channels, grooves or ridges on metal or other work. When the rail 41 is set to extend in a parallel direction to the lathe, the mechanism is neutral and will not course a helical path in front of a milling cutter. When the turn table 38 is rotated so that the rail 41 extends angularly away from the table 11, a rotational movement of the mandrel is provided. As the turn table 38 has the carriage 42 slidably mounted thereon, and the carriage moves and reciprocates with the table 11, the carriage thereby moving nearer to and farther away from the lathe in this manner reciprocating the rack bar 43, and as the latter is in engagement with the gearwheel 25, this gear is rotated. At the time that the gear 25 is being rotated, the cone 26 projecting from its face binds on the spindle 18 until the finger 34 by coming into contact with the stop 35 reverses or shifts the collar 28 so that it releases the cone 26 and binds the cone 27.

It is to be noted that certain changes in form and construction may be made without departing from the spirit and scope of the invention.

I claim:

1. A machine for cutting helical channels comprising a reciprocating table, means for reciprocating said table, a rotatable turn table beside the first-named table extending angularly to the path of travel of the turn table, said turn table being mounted stationary, a dove-tailed rail on said turntable, a carriage slidable on said rail, said carriage being movable with the table, a spindle on said first-named table, a split cone rotatably mounted loosely on said spindle, a gear rigid with the cone, said gear being adapted to be releasably locked to said spindle at intervals, a collar engaging said gear for locking the latter to the spindle, and means pivotally connected to said carriage for rotating the spindle a part of a revolution when said carriage and table is simultaneously reciprocated.

2. A machine for cutting helical channels comprising a reciprocating table, means for reciprocating the table, a rotatable and adjustable turn table normally secured angularly to the path of travel of the first-named table, a spindle rotatable on said table, a gear wheel rotatable on said spindle and having a split cone thereon adapted to engage said spindle for locking the gear to said spindle, a collar slidable longitudinally on said spindle and having a conical seat at its end, said cone being adapted to contact with said conical seat of said collar, said cone being adapted to be compressed by said collar to cause engagement of said cone with said spindle, a rail on said turn table being secured angularly to the path of travel of said table, a carriage slidable on said rail, a rack bar secured to said carriage and engaging the gear wheel, and clutch means for locking said cone rigid on the spindle.

In testimony whereof I affix my signature.

WILLIAM EISENBERG.